United States Patent [19]

Linde

[11] Patent Number: 4,478,455
[45] Date of Patent: Oct. 23, 1984

[54] HOLLOW ECCENTRIC BOLT FOR TAUMEL HINGE FITTING

[75] Inventor: Peter W. Linde, Battle Creek, Mich.

[73] Assignee: Keiper U.S.A., Inc., Battle Creek, Mich.

[21] Appl. No.: 371,820

[22] Filed: Apr. 26, 1982

[51] Int. Cl.³ .............................................. A47C 1/025
[52] U.S. Cl. ..................................... 297/362; 16/386; 74/804
[58] Field of Search .............. 297/355, 366, 367, 368, 297/371, 362; 74/804; 16/386

[56] References Cited

U.S. PATENT DOCUMENTS

| | | | |
|---|---|---|---|
| 3,471,892 | 10/1969 | Resag et al. | 297/366 X |
| 3,673,891 | 7/1972 | Pickles | 297/362 X |
| 4,195,884 | 4/1980 | Muhr et al. | 297/362 |
| 4,200,333 | 4/1980 | Cremer et al. | 74/804 X |
| 4,305,615 | 12/1981 | Osterhold | 297/362 X |
| 4,345,792 | 9/1982 | Shephard | 297/362 |
| 4,371,207 | 2/1983 | Wilking et al. | 297/362 X |

FOREIGN PATENT DOCUMENTS

| | | | |
|---|---|---|---|
| 1297496 | 6/1969 | Fed. Rep. of Germany | 297/366 |
| 2364754 | 8/1974 | Fed. Rep. of Germany | 297/367 |
| 2307495 | 11/1976 | France | 297/362 |
| 2463698 | 4/1981 | France | 297/362 |

Primary Examiner—William E. Lyddane
Assistant Examiner—Peter R. Brown

[57] ABSTRACT

A hollow eccentric taumel bolt having external eccentric cylindrical surfaces with parallel offset axes and an internal bearing surface for use in a taumel hinge fitting wherein adjustment is achieved by rotation of the eccentric bolt through the relative progression of a spur gear within a ring gear having at least one more tooth.

8 Claims, 5 Drawing Figures

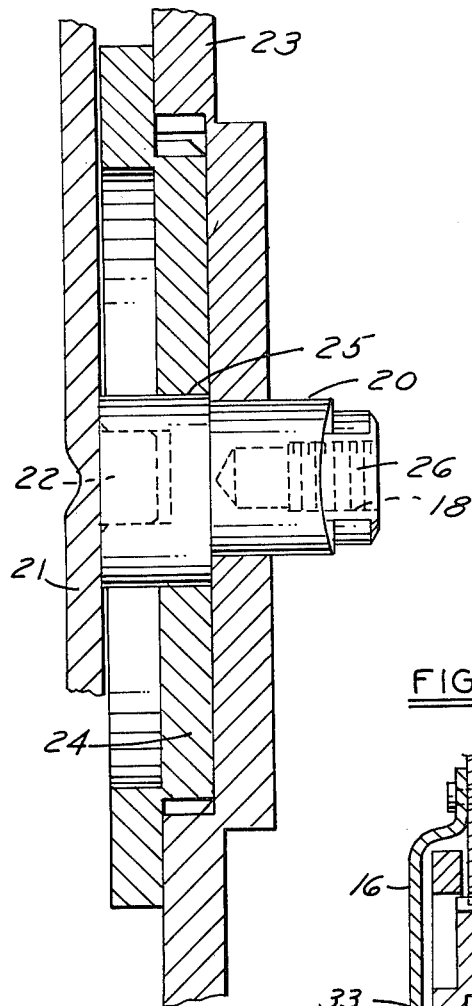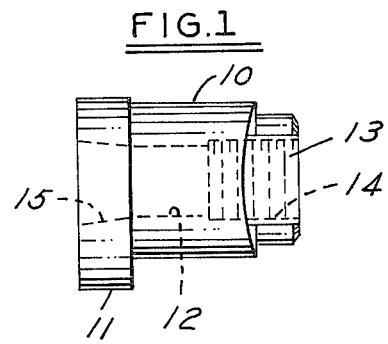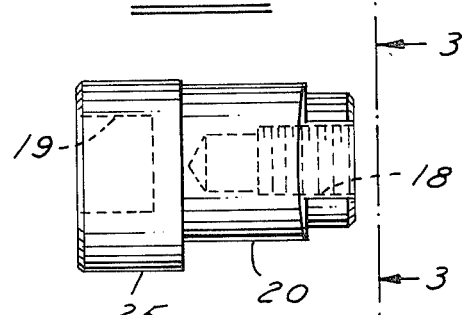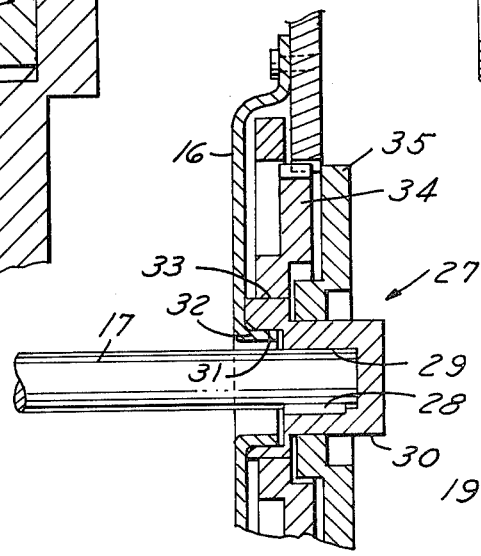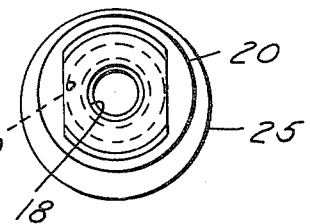

HOLLOW ECCENTRIC BOLT FOR TAUMEL HINGE FITTING

BACKGROUND OF THE INVENTION

In prior constructions such as disclosed in U.S. Pat. Nos. 3,432,880 and 3,432,881 eccentric elements for producing taumel action, have employed solid eccentric bolts which pivot within bearings respectively associated with the ring and spur gears. Such bolts are normally constructed with larger and smaller cylindrical surfaces having offset axes to produce eccentric relationship and, as in the prior art patents referred to above, the larger diameter may be fitted with an added external coupling to provide a drive connection between opposed driving and slave hinge units on opposite sides of the seat.

SUMMARY OF THE INVENTION

By constructing the eccentric element as a one-piece hollow eccentric bolt with outside and inside concentric cylindrical surfaces and an outside large diameter eccentric cylindrical surface, formed as a powdered metal unit or preferably as a cold formed steel bolt, a smaller lighter more uniform construction is made possible accommodating a more compact installation and the provision of a one piece backing plate and bushing engaging the hollow cylindrical bearing surface of the bolt.

BRIEF DESCRIPTION OF THE DRAWINGS

FIG. 1 is a side elevation of a first embodiment of the invention illustrating a through bearing hole;

FIG. 2 is a side elevation of a second embodiment including a bearing pocket in a threaded aperture;

FIG. 3 is an end view taken along the line 3—3 of FIG. 2;

FIG. 4 is a fragmentary view of the eccentric bolt of FIG. 2 installed in the pivotal elements of a taumel hinge;

FIG. 5 is a fragmentary sectional view of a modified embodiment of the hollow eccentric bolt installed as an element of a slave taumel hinge.

DESCRIPTION OF THE PREFERRED EMBODIMENTS

With reference to FIG. 1 the eccentric bolt disclosed includes cylindrical eccentric surfaces 10 and 11, a through bore 12 coaxial with cylindrical surface 10 and a flatted drive extension 13 adapted for attachment to a hand knob or other drive provision.

The end of bore 12 may be threaded as indicated at 14 to accommodate hand knob attachment. The other end of bore 12, which may be slightly tapered as shown at 15, will serve as a bearing surface for a backing plate such as 16 in FIG. 5.

With reference to FIGS. 2 and 4, the modified embodiment includes a tapped blind hole 18 at one end and a somewhat enlarged cylindrical blind bore 19 coaxial with the cylindrical surface 20 serving as a bearing surface for backing plate 21 having an integral projection 22 extruded to provide a stub cylindrical bearing surface.

Backing plate 21 is secured to ring gear element 23 of the taumel hinge, as by rivet means shown in FIG. 5, and spur gear 24 having at least one tooth less than ring gear 23 is caused to progressively engage and rotate within ring gear 23 through the action of eccentric cylindrical surface 25 upon rotation of the eccentric bolt. Flatted extension 26 together with tapped threads 18 serve for attachment of a hand knob for driving the eccentric bolt which in this case is employed for adjustment of a single side seat hinge recliner.

With reference to FIG. 5 a further modified embodiment of the eccentric bolt 27 is adapted for a slave side hinge wherein drive from a master side eccentric bolt is transmitted through tube 17 which may be keyed as at 28 within bore 29 formed coaxially with cylindrical surface 30. In this case enlarged counterbore 31 is provided as a bearing surface for inwardly formed projection 32 of backing plate 16 and eccentric surface 33 of eccentric bolt 27 engages spur gear 34 rotatable within ring gear 35 piloted on cylindrical surface 30 to provide taumel drive action as in the case of the FIG. 4 embodiment.

In each of the embodiments the internal cylindrical bearing surface provides a lighter weight eccentric bolt which occupies less space and may readily be produced as a powdered metal or cold formed forging.

I claim:

1. In combination a backing plate having a male cylindrical projection, a taumel eccentric bolt comprising a body having external eccentric cylindrical surfaces with parallel offset axes, an internal cylindrical bearing surface in said bolt coaxial with one of said external cylindrical surfaces engaging said projection, and a taumel element pivoted on said coaxial external cylindrical surface and secured to said backing plate.

2. The eccentric bolt of claim 1 wherein one of said external cylindrical surfaces is relatively larger than the other and is formed at one end of the eccentric bolt to include said internal cylindrical bearing surface for the backing plate.

3. The eccentric bolt of claim 2 wherein the other end of said eccentric bolt is formed with an extension adapted to provide a drive connection.

4. The eccentric bolt of claim 2 wherein an internal pocket is provided within said eccentric bolt adapted to provide a drive connection to a transmitting element projecting through said backing plate.

5. The eccentric bolt of claim 1 or 2 including an internal through passage coaxial with one of said external cylindrical surfaces which is threaded at one end to facilitate a drive connection and adapted to provide a bearing surface at the other end.

6. An eccentric bolt as set forth in claim 1 or 2 wherein said internal bearing surface is provided as a blind internal cylindrical recess.

7. An eccentric bolt as set forth in claim 1 or 2 wherein said internal bearing surface is provided as a blind internal cylindrical recess and said other end is provided with a coaxial tapped hole to facilitate a drive connection.

8. The eccentric bolt of claim 4 wherein said internal bearing surface is provided as an enlarged counterbore at an open end of said pocket.

* * * * *